US012048943B2

(12) United States Patent
Zhu et al.

(10) Patent No.: US 12,048,943 B2
(45) Date of Patent: Jul. 30, 2024

(54) ADHESIVE COATING AND PERFORATING DEVICE FOR MEDICAL ADHESIVE TAPE TECHNICAL FIELD

(71) Applicant: Nanjing 3H Medical Products Co., Ltd., Nanjing (CN)

(72) Inventors: Zhiyang Zhu, Nanjing (CN); Xiuchong He, Nanjing (CN); Xiaoliang Tao, Nanjing (CN); Chun Yang, Nanjing (CN)

(73) Assignee: Nanjing 3H Medical Products Co., Ltd., Nanjing (CN)

( * ) Notice: Subject to any disclaimer, the term of this patent is extended or adjusted under 35 U.S.C. 154(b) by 304 days.

(21) Appl. No.: 17/846,964

(22) Filed: Jun. 22, 2022

(65) Prior Publication Data

US 2022/0347714 A1 Nov. 3, 2022

Related U.S. Application Data

(63) Continuation of application No. PCT/CN2020/086895, filed on Apr. 25, 2020.

(30) Foreign Application Priority Data

Dec. 26, 2019 (CN) ......................... 201911363007.9

(51) Int. Cl.
*B05C 11/02* (2006.01)
*B05C 11/10* (2006.01)
*B26F 1/10* (2006.01)

(52) U.S. Cl.
CPC ........ *B05C 11/025* (2013.01); *B05C 11/1005* (2013.01); *B26F 1/10* (2013.01)

(58) Field of Classification Search
CPC . B05C 11/025; B05C 11/1005; B05C 5/0245; B26F 1/10
See application file for complete search history.

(56) References Cited

U.S. PATENT DOCUMENTS

2014/0347464 A1 11/2014 Yada et al.

FOREIGN PATENT DOCUMENTS

CN 201565407 U * 9/2010
CN 201565407 U 9/2010

(Continued)

OTHER PUBLICATIONS

Internation Search Report of PCT/CN2020/086895, Mailed Sep. 29, 2020.

(Continued)

*Primary Examiner* — Daniel McNally

(57) ABSTRACT

An adhesive coating and perforating device for a medical adhesive tape comprises a rack (1), an unwinding roller (2), a winding roller (3), a hot melt adhesive die head (4), an adhesive coating roller (5), a support roller (6) and a perforating roller (7); the unwinding roller (2) is used for placing a cotton cloth to be coated with adhesive, the winding roller (3) is used for winding the adhesive tape coated with adhesive, the hot melt adhesive die head (4) is used for heating a hot melt adhesive and coating the hot melt adhesive on the cotton cloth, the adhesive coating roller (5) is used for pushing the cotton cloth in a direction towards the hot melt adhesive die head (4), and a surface of the perforating roller (7) is provided with protruding points for perforating the hot melt adhesive on a surface of cotton cloth.

10 Claims, 5 Drawing Sheets

(56) References Cited

FOREIGN PATENT DOCUMENTS

| | | | | |
|---|---|---|---|---|
| CN | 205020326 | U | | 2/2016 |
| CN | 205128297 | U | | 4/2016 |
| CN | 205238168 | U | * | 5/2016 |
| CN | 205238168 | U | | 5/2016 |
| CN | 208050253 | U | | 11/2018 |
| CN | 111036487 | A | | 4/2020 |
| IN | 205436193 | U | | 8/2016 |
| KR | 20190097934 | A | | 8/2019 |

OTHER PUBLICATIONS

Yao, Xiaofeng, "non-official translation: Trend Analysis of Needle Roller Punching Machine", Oct. 8, 2014, part 1 and part 2 , section 7.

* cited by examiner

ADHESIVE COATING AND PERFORATING DEVICE FOR MEDICAL ADHESIVE TAPE TECHNICAL FIELD

CROSS-REFERENCE TO RELATED APPLICATIONS

This application is a continuation of International Patent Application No. PCT/CN2020/086895 with a filing date of Apr. 25, 2020, designating the United States, now pending, and further claims priority to Chinese Patent Application No. 201911363007.9 with a filing date of Dec. 26, 2019. The content of the aforementioned applications, including any intervening amendments thereto, are incorporated herein by reference.

TECHNICAL FIELD

The present invention relates to an adhesive coating and perforating device for a medical adhesive tape.

BACKGROUND

Medical adhesive tape is one of commonly used tools in the medical field, such as fixing a syringe needle in injection and fixing a gauze after dressing a wound. The medical adhesive tape is made of a cotton cloth coated with a hot melt adhesive on an adhesive coating device, and the hot melt adhesive on the cotton cloth is perforated during manufacturing of the medical adhesive tape to ensure an air permeability of the medical adhesive tape. An existing adhesive coating and perforating device is composed of a rack, an unwinding roller, a winding roller, a hot melt adhesive die head and a pressing roller. A thickness of coated adhesive of the existing adhesive coating device is not easy to control, and an adhesive surface of a product is complete and airtight, with poor air permeability.

SUMMARY

The present invention aims to provide an adhesive coating and perforating device for a medical adhesive tape, which solves technical defects of difficult control of thickness of coated adhesive and poor air permeability during manufacturing of the medical adhesive tape in the prior art.

In order to solve the above problems, the technical solutions used in the present invention are as follows: an adhesive coating and perforating device for a medical adhesive tape comprises a rack, an unwinding roller, a winding roller, a hot melt adhesive die head, an adhesive coating roller, a support roller and a perforating roller, wherein the unwinding roller is used for placing a cotton cloth to be coated with adhesive, the winding roller is rotatably arranged on the rack, driven by a winding driving device to rotate relative to the rack, and used for winding the adhesive tape coated with adhesive, the hot melt adhesive die head is mounted on the rack and used for heating a hot melt adhesive and coating the hot melt adhesive on the cotton cloth, two ends of the adhesive coating roller are rotatably mounted on the rack, and the adhesive coating roller is located at a hot melt adhesive outlet side and used for pushing the cotton cloth in a direction towards the hot melt adhesive die head, two ends of the support roller are rotatably arranged on the rack, two ends of the perforating roller are rotatably connected to the rack and capable of vertically moving on the rack, the cotton cloth coated with adhesive passes between the perforating roller and the support roller, and a surface of the perforating roller is provided with protruding points for perforating the hot melt adhesive on a surface of cotton cloth. In the present invention, the perforating roller and the support roller are arranged, since the perforating roller may slide up and down, a distance between the perforating roller and the support roller may be adjusted, when the cotton cloth coated with adhesive passes between the perforating roller and the support roller, the distance between the perforating roller and the support roller may be adjusted according to a thickness of coated adhesive, and excess adhesive coated on the cotton cloth is squeezed out, so that a thickness of the cotton cloth is ensured, and the thickness of the cotton cloth is uniform, and in the present invention, sunken and protruding points are arranged on the perforating roller, and corresponding holes may be perforated in a surface of the cotton cloth coated with adhesive, thus improving an air permeability of the medical adhesive tape.

As a further improvement of the present invention, the rack is provided with a roasting roller frame, a vertical guide groove is formed on the roasting roller frame, a slider is arranged in the vertical guide groove, the slider is capable of moving vertically in the vertical guide groove, an upper portion of the roasting roller frame is provided with a slider driving device for driving the slider to move vertically, and two ends of the perforating roller are rotationally connected to the slider. In the present invention, the slider moves in the vertical guide groove, and the perforating roller and the slider move up and down synchronously, so that the distance between the perforating roller and the support roller is adjusted.

As a further improvement of the present invention, a threaded hole is formed in the roasting roller frame, the slider driving device is a screw, the screw penetrates through the threaded hole and is in screw-thread fit with the threaded hole, a bottom end of the screw abuts against a top portion of the slider to press the slider downwardly, and a bottom portion of the slider is provided with an elastic member for pushing the slider upwardly when the screw moves upwardly. In the present invention, the screw moves up and down through relative rotation between the screw and the roasting roller frame, thus driving the slider to slide downwardly, and the slider slides upwardly under upward pushing by the elastic member.

As a further improvement of the present invention, the elastic member is more than one spring, a guide hole communicated with the vertical guide groove is formed in a bottom portion of the roasting roller frame, a bottom end of the slider is fixed with a guide rod, and when the slider slides vertically, the guide rod moves in the guide hole. In the present invention, the spring stretches to push the slider upwardly, while the spring is compressed to store energy when the slider moves downwardly, and in the present invention, the guide rod guides the slider to move up and down, which can effectively prevent the slider from horizontally sliding out of the vertical guide groove.

As a further improvement of the present invention, one end of the rack for mounting the winding roller is provided with a winding bracket, a U-shaped groove is formed on the winding bracket, an opening of the U-shaped groove faces one side far away from the rack, the unwinding roller is mounted in the U-shaped groove, and the winding bracket is rotatably provided with a fixing member at one side of the opening of the U-shaped groove for fixing the winding roller in the U-shaped groove when in use. In the present invention, the U-shaped groove is used for supporting the winding roller, and the fixing member is used for blocking the winding roller in the U-shaped groove during winding.

As a further improvement of the present invention, the fixing member comprises a blocking rod, one end of the blocking rod is rotatably connected to the winding bracket, and the other end of the blocking rod is a free end for being detachably connected to the winding bracket when in use, thus blocking the winding roller in the U-shaped groove. In the present invention, rotation of the blocking rod may be used for opening or closing the opening of the U-shaped groove, which is convenient for mounting and taking out the winding roller.

As a further improvement of the present invention, a bottom end of the blocking rod is rotatably connected to a lower portion of the winding bracket, a first mounting groove communicated with the U-shaped groove is formed at one side of a top portion of the winding bracket far away from the rack, a second mounting groove corresponding to the first mounting groove is formed at the free end of the blocking rod, a fixing rod is rotatably arranged in the first mounting groove, the fixing rod is provided with a fixing block in screw-thread fit with the fixing rod, and the fixing rod is turned up and down and matched with the fixing block to fix the free end of the blocking rod when in use. In the present invention, the fixing rod is rotated and matched with the fixing block to fix the blocking rod.

As a further improvement of the present invention, a mounting notch is formed at one end of the rack for mounting the unwinding roller, the rack below the mounting notch is rotatably provided with two support wheels for supporting the unwinding roller from the bottom portion, the rack is rotatably provided with a pressing wheel mounting frame, the pressing wheel mounting frame is rotatably provided with two pressing wheels, the two pressing wheels are used for pressing the unwinding roller downwardly from the top portion, and the rack is provided with a mounting frame driving device for driving the pressing wheel mounting frame to turn up and down to make the pressing wheels close to or far away from the unwinding roller. In the present invention, the bottom portion of the unwinding roller is supported by the support wheels, and the top portion of the unwinding roller is pressed downwardly by the pressing wheels, so that the unwinding roller is rotatably mounted on the rack.

As a further improvement of the present invention, the pressing wheel mounting frame comprises a mounting frame body and a connecting rod, a middle portion of the connecting rod is rotationally connected to the rack by a rotating shaft, one end of the connecting rod is fixedly connected to the mounting frame body, the other end of the connecting rod is connected to the mounting frame driving device, the rack is provided with a limiting block above the connecting rod, wherein the limiting block is located at one side close to the mounting frame driving device, and when the pressing wheels press the unwinding roller downwardly, a top portion of the connecting rod is contacted with the limiting block. In the present invention, the mounting frame body is rotated accordingly, so that a distance between the pressing wheels and the unwinding roller may be adjusted, the unwinding roller may be conveniently placed and dismounted, and the limiting block limits rotation of the connecting rod.

As a further improvement of the present invention, the rack is provided with a die head mounting frame, the hot melt adhesive die head is mounted on the die head mounting frame, the die head mounting frame comprises a horizontal support plate and two vertical support plates, top ends of the two vertical support plates are respectively connected to two ends of the horizontal support plate, middle portions of the vertical support plates are connected to the rack, a lower portion of the rack is provided with a support plate driving device for driving the vertical support plates to rotate relative to the rack, and the support plate driving device drives the vertical support plates to rotate for adjusting a distance between the hot melt adhesive die head and the adhesive coating roller. In the present invention, since the die head mounting frame is arranged and rotated relative to the rack, the distance between the hot melt adhesive die head and the adhesive coating roller may be adjusted, and the thickness of the coated adhesive of the medical adhesive tape is controlled before perforating, so as to further adjust a thickness of adhesive coated on the cotton cloth, which is namely a thickness of the hot melt adhesive on the finished medical adhesive tape.

To sum up, the present invention has the beneficial effects that: in the present invention, the thickness of adhesive coated on the cotton cloth may be controlled, and the hot melt adhesive on the cotton cloth may be perforated, so that the adhesive tape has a good air permeability, in the present invention, the thickness of adhesive coated on the adhesive tape is uniform, thus having a good overall quality, and the present invention also has an advantage of simple structure.

1 refers to rack; 101 refers to left vertical plate; 102 refers to right vertical plate; 103 refers to connecting column; 104 refers to first turning roller; 105 refers to second turning roller; 2 refers to unwinding roller; 3 refers to winding roller; 4 refers to hot melt adhesive die head; 5 refers to adhesive coating roller; 6 refers to support roller; 7 refers to perforating roller; 8 refers to roasting roller frame; 9 refers to vertical guide groove; 10 refers to slider; 11 refers to screw; 12 refers to elastic member; 13 refers to guide rod; 14 refers to winding bracket; 15 refers to U-shaped groove; 16 refers to blocking rod; 17 refers to first mounting groove; 18 refers to second mounting groove; 19 refers to fixing rod; 20 refers to fixing block; 21 refers to mounting notch; 22 refers to support wheel; 23 refers to pressing wheel; 24 refers to mounting frame driving device; 25 refers to mounting frame body; 26 refers to connecting rod; 27 refers to limiting block; 28 refers to horizontal support plate; 29 refers to vertical support plate; 30 refers to support plate driving device; 31 refers to hand wheel; and 32 refers to rotating seat.

DETAILED DESCRIPTION

The specific embodiments of the present invention are further described hereinafter with reference to the accompanying drawings.

Figure 1:
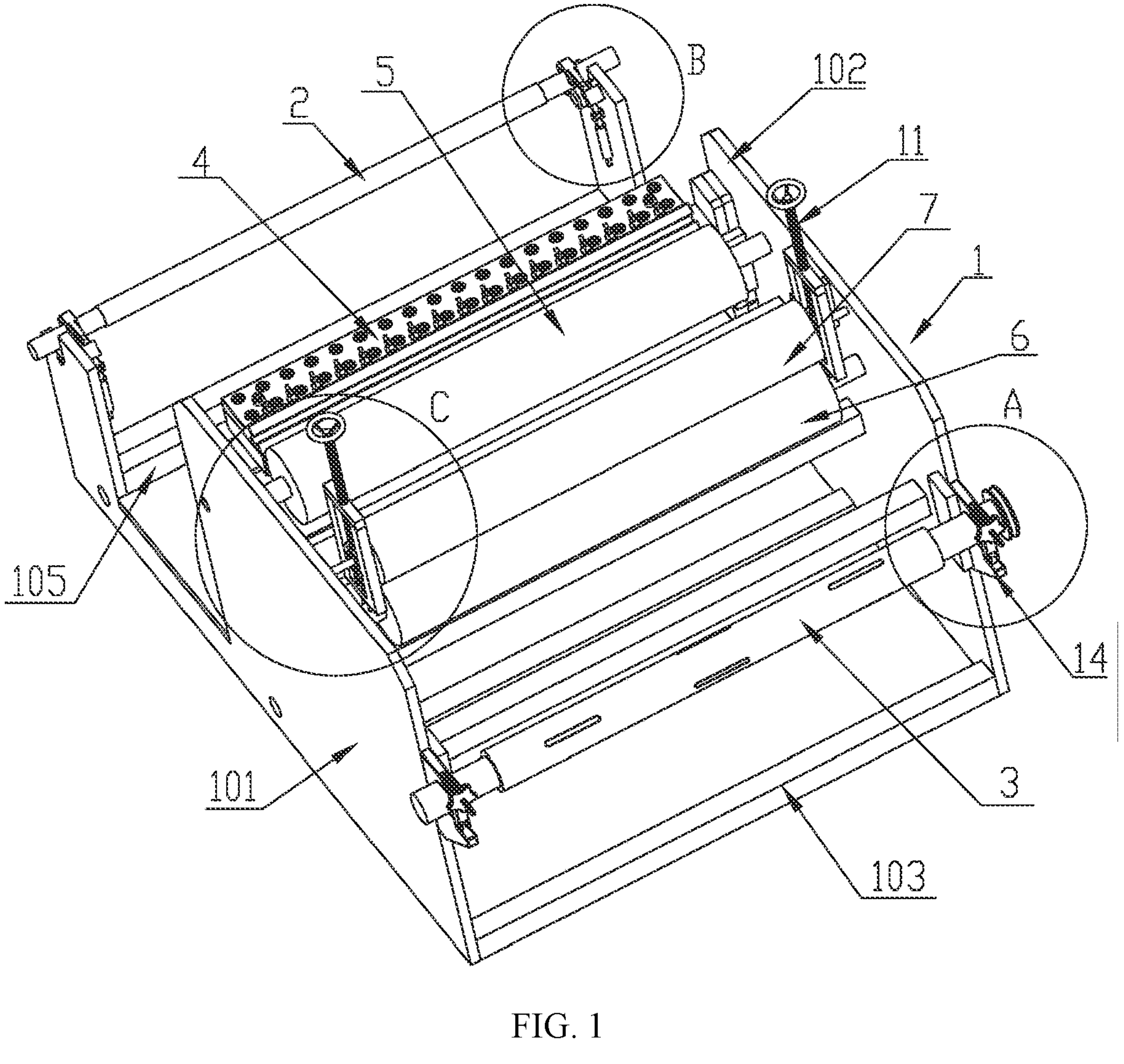
FIG. 1 is a stereoscopic structure diagram of the present invention.
Figure 5:
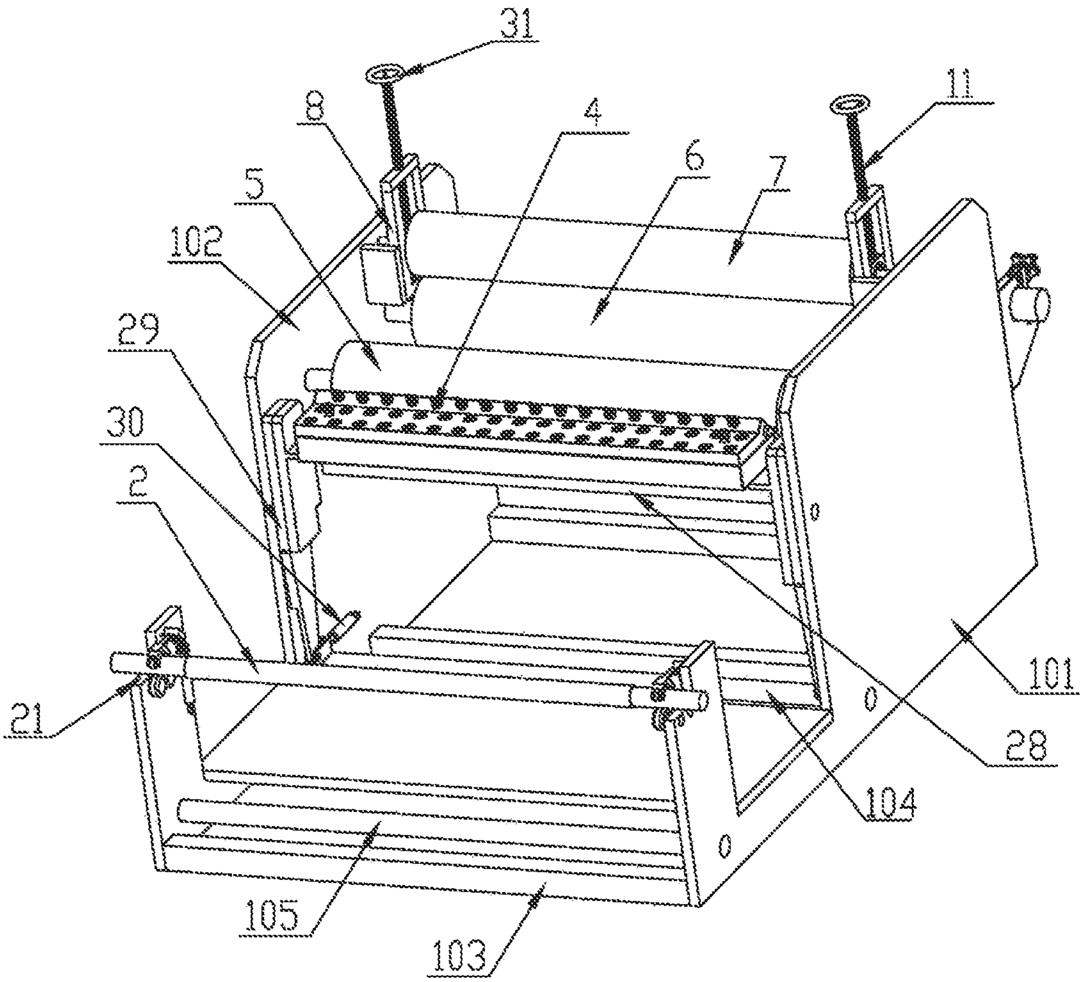
FIG. 5 is a stereoscopic structure diagram of the present invention from another perspective.

As shown in FIG. 1 and FIG. 5, an adhesive coating and perforating device for a medical adhesive tape comprises a rack 1, an unwinding roller 2, a winding roller 3, a hot melt adhesive die head 4, an adhesive coating roller 5, a support roller 6 and a perforating roller 7. The rack 1 comprises a left vertical plate 101, a right vertical plate 102, and a plurality of connecting columns 103 connecting the left vertical plate 101 with the right vertical plate 102, wherein the left vertical plate 101 and the right vertical plate 102 are arranged in parallel, and the connecting columns 103 are fixedly connected to the left vertical plate 101 and the right vertical plate 102 by welding.

In the present invention, the unwinding roller 2 is rotatably arranged at a front end of the rack 1, and two ends of the unwinding roller are rotatably connected to the left vertical plate 101 and the right vertical plate 102 respectively for placing a cotton cloth to be coated. The winding roller 3 is rotatably arranged at a rear end of the rack 1 and driven by a winding driving device (not shown in the drawings) to rotate relative to the rack 1. In the present invention, two ends of the winding roller 3 are rotatably connected to the left vertical plate 101 and the right vertical plate 102 respectively for winding the cotton cloth coated with adhesive. In the present invention, the hot melt adhesive die head 4 is mounted on the rack 1 for heating a hot melt adhesive and coating the hot melt adhesive on the cotton cloth. Two ends of the adhesive coating roller 5 are rotatably mounted on the rack 1 and the adhesive coating roller 5 is located at a hot melt adhesive outlet side and used for pushing the cotton cloth in a direction towards the hot melt adhesive die head 4. In the present invention, the two ends of the adhesive coating roller 5 are rotatably connected to the left vertical plate 101 and the right vertical plate 102 respectively. In the present invention, two ends of the support roller 6 are rotatably arranged on the rack 1, two ends of the perforating roller 7 are rotatably connected to the rack 1 and capable of moving vertically on the rack 1, and center lines of the support roller 6 and the perforating roller 7 are located on the same vertical plane. The coated cotton cloth passes between the perforating roller 7 and the support roller 6, and a surface of the perforating roller 7 is provided with protruding points (not shown in the drawings) for perforating the hot melt adhesive on a surface of the cotton cloth. In the present invention, a first turning roller 104 and a second turning roller 105 are rotatably arranged between the left vertical plate 101 and the right vertical plate 102, and two ends of the first turning roller 104 and the second turning roller 105 are rotatably connected to the left vertical plate 101 and the right vertical plate 102 by bearings respectively, wherein the first turning roller 104 is located just below the adhesive coating roller 5, and the second turning roller 105 is located just below the unwinding roller 2. The cotton cloth on the unwinding roller 2 is unwound, then wound through the second turning roller 105 and the first turning roller 104 downwardly in sequence, and then passes between the hot melt adhesive die head 4 and the adhesive coating roller 5 to be coated with adhesive, and then the cotton cloth passes between the support roller 6 and the perforating roller 7 to be perforated and then wound by the winding roller 3. In the present invention, a sleeve made of resin is sleeved on an outer surface of the perforating roller 7, and the protruding points are arranged on the sleeve. In the present invention, the adhesive coating roller 5, the support roller 6 and the perforating roller 7 are all heating rollers of heat-conducting oil, and structures of the rollers used for communicating with the heat-conducting oil belong to the prior art, which will not be described in detail in the present invention. In order to facilitate quick solidification of the adhesive, in the present invention, a distance between the winding roller 3 and the perforating roller 7 may be set to be larger, such as one meter to two meters. In the present invention, the hot melt adhesive die head 4 belongs to the prior art and may be directly purchased commercially. For example, the hot melt adhesive die head 4 of a Shangrui model produced by Ruian Shangrui Machinery Co., Ltd. may be used.

Figure 4:
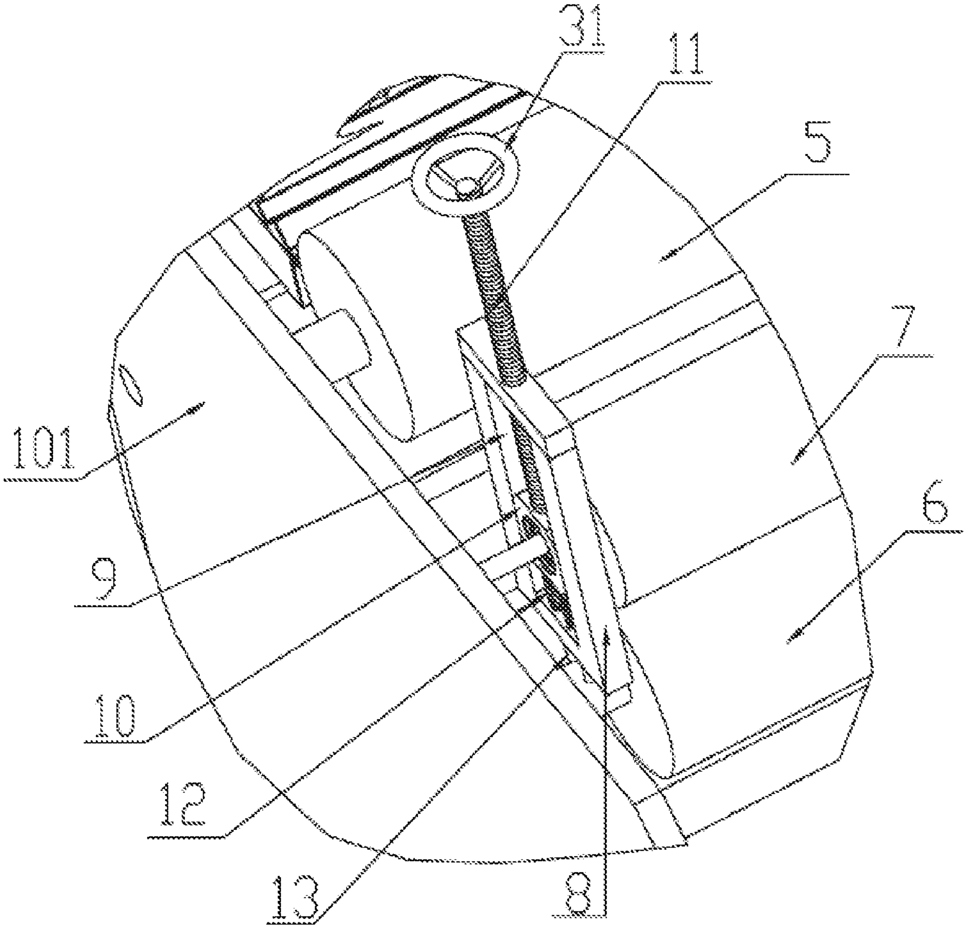
FIG. 4 is a locally enlarged view of a part C in FIG. 1.

As shown in FIG. 4, in the present invention, a specific mounting structure of the perforating roller 7 is as follows: a roasting roller frame 8 is detachably mounted on the rack 1 by a bolt. In the present invention, the left vertical plate 101 and the right vertical plate 102 are respectively provided with one roasting roller frame 8, a vertical guide groove 9 is formed on the roasting roller frame 8, the vertical guide groove 9 penetrates through left and right sides of the roasting roller frame 8, and the vertical guide groove 9 has a rectangular longitudinal section. A slider 10 is arranged in the vertical guide groove 9, and the slider 10 may move vertically in the vertical guide groove 9. In the present invention, a slider driving device is arranged at an upper portion of the roasting roller frame 8 and used for driving the slider 10 to slide vertically. In the present invention, two ends of the perforating roller 7 are rotatably connected to the slider 10 by bearings, and the slider driving device drives the slider 10 to slide vertically in the vertical guide groove 9. The perforating roller 7 moves up and down with the slider 10, and when the perforating roller 7 moves upwardly, a distance between the perforating roller 7 and the support roller 6 is increased, while when the perforating roller 7 moves downwardly, the distance between the perforating roller 7 and the support roller 6 is reduced. In the present invention, a change of the distance between the perforating roller 7 and the support roller 6 is used for changing a depth of holes in the cotton cloth and a thickness of adhesive coated on the whole cotton cloth.

In the present invention, a threaded hole (not shown in the drawings) is formed in the roasting roller frame 8, and the threaded hole is communicated with a top portion of the vertical guide groove 9. The slider driving device is a screw 11, the screw 11 penetrates through the threaded hole and is in screw-thread fit with the threaded hole, a bottom end of the screw 11 abuts against a top portion of the slider 10 to press the slider 10 downwardly, and a bottom portion of the slider 10 is provided with an elastic member 12 for pushing the slider 10 upwardly when the screw 11 moves upwardly. In the present invention, the elastic member 12 is more than one spring, a guide hole (not shown in the drawings) communicated with the vertical guide groove 9 is formed in a bottom portion of the roasting roller frame 8, a bottom end of the slider 10 is fixed with a guide rod 13, and when the slider 10 slides vertically, the guide rod 13 moves in the guide hole. In the present invention, preferably, two springs are provided, and two guide rods 13 are also provided. The two springs are sleeved on the two guide rods 13 respectively, top ends of the guide rods 13 are fixed with a bottom end of the slider 10 by welding, top ends of the springs are connected to a lower surface of the slider 10, and bottom ends of the springs are connected to a bottom portion of the vertical guide groove 9. In the present invention, the top ends and the bottom ends of the springs may only be connected to the slider 10 and the bottom portion of the vertical guide groove 9 respectively but not fixed. In the present invention, when the screw 11 is rotated relative to the roasting roller frame 8, since the roasting roller frame 8 itself cannot be rotated, the screw 11 vertically moves relative to the roasting roller frame 8 while being rotated. When the screw 11 moves downwardly, the slider 10 is pushed downwardly, so that the perforating roller 7 is close to the support roller 6, the distance between the perforating roller 7 and the support roller 6 is reduced, and the guide rod 13 moves downwardly in the guide hole. At the moment, the spring is compressed and deformed to store energy. When the screw 11 moves upwardly, the spring stretches to push the slider 10 upwardly. At the moment, the guide rod 13 moves upwardly in the guide groove, the perforating roller 7 moves upwardly with the slider 10, and the distance between the perforating roller 7 and the support roller 6 is increased. In the present invention, preferably, a hand wheel 31 is fixed at a top end of the screw 11, which is convenient for rotating the screw 11.

Figure 2:
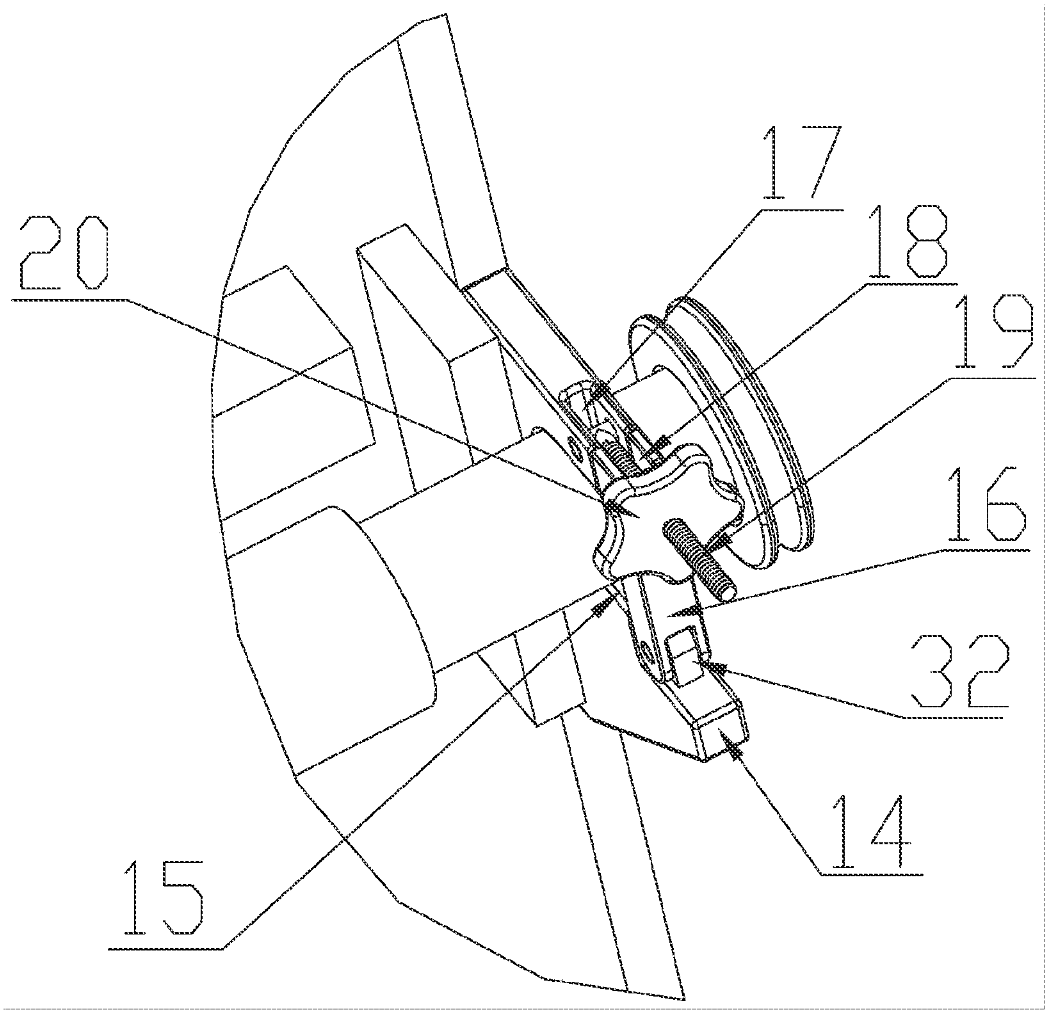
FIG. 2 is a locally enlarged view of a part A in FIG. 1.

As shown in FIG. 2, in the present invention, a specific structure of the winding roller 3 mounted on the rack 1 is as follows: a winding bracket 14 is detachably mounted at one end of the rack 1 for mounting the winding roller 3 by a bolt, a U-shaped groove 15 is formed on the winding bracket 14, an opening of the U-shaped groove 15 faces a side far away from the rack 1, and the winding roller 3 is mounted in the U-shaped groove 15. In the present invention, one bearing (not shown in the drawing) is respectively mounted on parts at two ends of the winding roller 3 mounted in the U-shaped groove 15, and a depth of the U-shaped groove 15 is equal to an outer diameter of an outer ring of the bearing. The winding bracket 14 is rotatably provided with a fixing member at one side of the opening of the U-shaped groove 15 for fixing the winding roller 3 in the U-shaped groove 15 when in use. In the present invention, the fixing member comprises a blocking rod 16, one end of the blocking rod 16 is rotationally connected to the winding bracket 14. In the present invention, a rotating seat 32 is fixedly arranged (such as welding) on the winding bracket 14. One end of the blocking rod 16 is provided with a connecting groove, the rotating seat 32 is located in the connecting groove, and the blocking rod 16 is rotatably mounted on the rotating seat 32 by a rotating pin penetrating through a bottom portion of the blocking rod 16 and the rotating seat 32. The other end of the blocking rod 16 (which is namely one end far away from the rotating seat 32) is a free end for being detachably connected to the winding bracket 14 when in use, thus blocking the winding roller 3 in the U-shaped groove 15. In the present invention, a bottom end of the blocking rod 16 is rotatably connected to a lower portion of the winding bracket 14, which means that the rotating seat 32 is arranged at the lower portion of the winding bracket 14. A first mounting groove 17 communicated with the U-shaped groove 15 is formed at one side of a top portion of the winding bracket 14 far away from the rack 1, a second mounting groove 18 corresponding to the first mounting groove 17 is formed at the free end of the blocking rod 16, and a fixing rod 19 is rotatably arranged in the first mounting groove 17. The fixing rod 19 comprises a screw rod and a rotating rod, two ends of the rotating rod are rotationally connected to parts of the winding bracket 14 located at two sides of the first mounting groove 17, one end of the screw rod is located in the first mounting groove 17 and perpendicular to the rotating rod, and the screw rod is fixedly connected to the rotating rod (such as welding). The screw rod of the fixing rod 19 is provided with a fixing block 20 in screw-thread fit with the screw rod of the fixing rod, and the screw rod of the fixing rod 19 is turned up and down and matched with the fixing block 20 to fix the free end of the blocking rod 16 when in use. In the present invention, when in use, the free end of the blocking rod 16 is rotated downwardly, the screw rod is rotated upwardly, then the winding roller 3 is placed in the U-shaped groove 15, then the blocking rod 16 is rotated upwardly to a vertical state, and the screw rod is turned downwardly to a horizontal state. At the moment, one end of the screw rod far away from the winding bracket 14 is located in the second mounting groove 18, and the fixing block 20 is rotated, so that the fixing block 20 compresses the blocking rod 16 to prevent the blocking rod 16 from rotating, thus fixing the winding roller 3 when in use. A process of dismounting the winding roller 3 is opposite to the previous process of mounting, which will not be repeated in the present invention.

Figure 3:
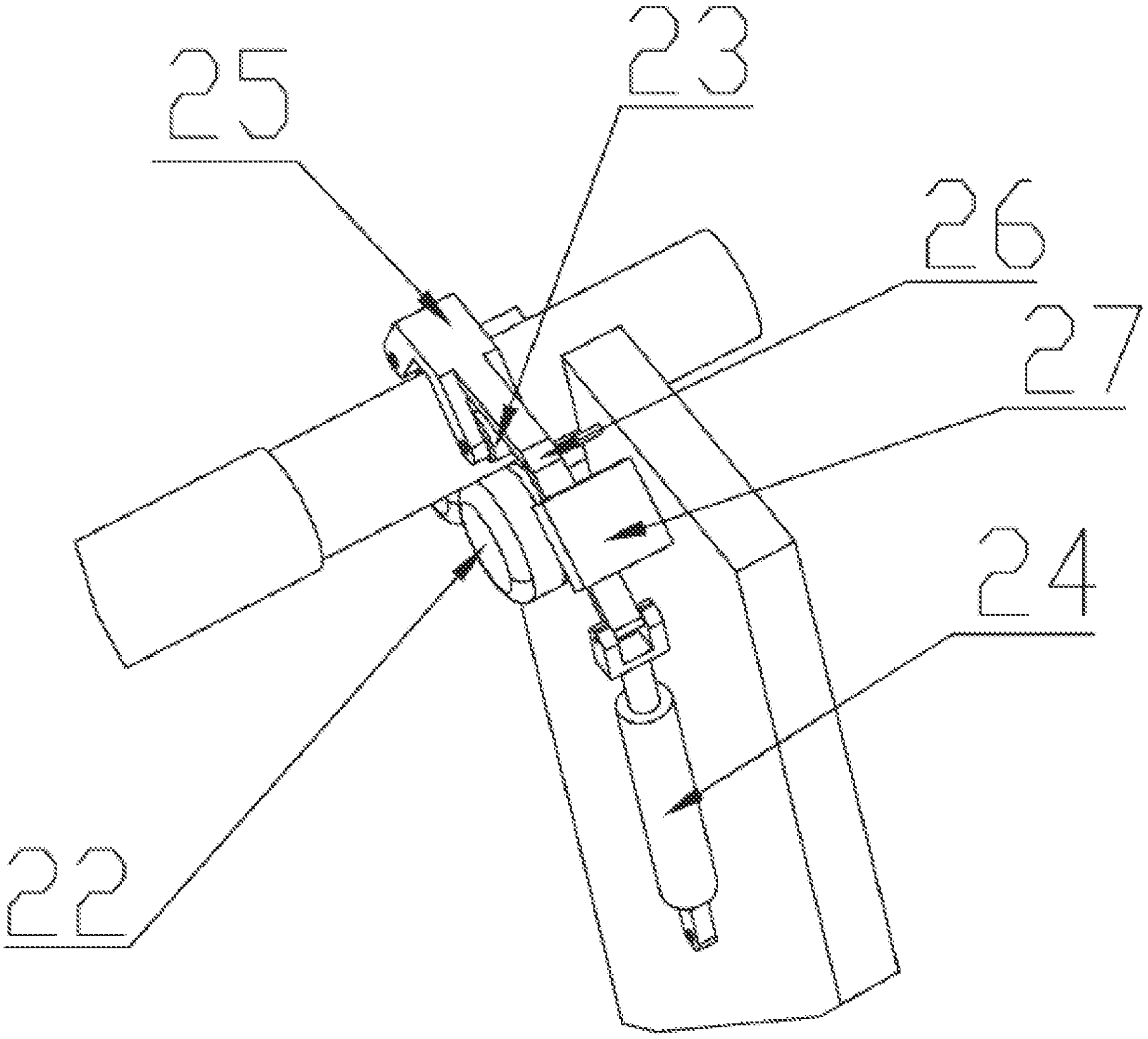
FIG. 3 is a locally enlarged view of a part B in FIG. 1.

As shown in FIG. 3, in the present invention, a specific structure of the unwinding roller 2 mounted on the rack 1 is as follows: a mounting notch 21 is formed at one end of the rack 1 for mounting the unwinding roller 2, which means that the left vertical plate 101 and the right vertical plate 102 are both provided with the mounting notch 21. The rack 1 below the mounting notch 21 (which is namely the left vertical plate 101 and the right vertical plate 102) is rotatably provided with front and rear support wheels 22 for supporting the unwinding roller 2 from the bottom portion, the two support wheels 22 have the same dimension, and center lines of the two support wheels 22 are located on the same horizontal plane. The rack 1 is rotatably provided with a pressing wheel mounting frame, the pressing wheel mounting frame is rotatably provided with two pressing wheels 23, the two pressing wheels 23 are used for pressing the unwinding roller 2 downwardly from the top portion, and the rack 1 is provided with a mounting frame driving device 24 for driving the pressing wheel mounting frame to turn up and down to make the pressing wheels 23 close to or far away from the unwinding roller 2. In the present invention, the left vertical plate 101 and the right vertical plate 102 are provided with the mounting frame driving device 24. In the present invention, the mounting frame driving device 24 is preferably a mounting frame driving cylinder mounted on the left vertical plate 101 and the right vertical plate 102.

In the present invention, the pressing wheel mounting frame comprises a mounting frame body 25 and a connecting rod 26, and a middle portion of the connecting rod 26 is rotationally connected to the rack 1 by a rotating shaft. In the present invention, the connecting rod 26 is used for bending into an obtuse angle with a downward opening with a rotating joint with the rack 1. One end of the connecting rod 26 is fixedly connected to the mounting frame body 25, and the other end of the connecting rod 26 is connected to the mounting frame driving device 24. In the present invention, an end portion of the connecting rod 26 is rotationally connected to a piston rod of the mounting frame driving cylinder, and the piston rod of the mounting frame driving cylinder is contracted to drive the connecting rod 26 to rotate, so as to drive the mounting frame body 25 and the pressing wheels 23 mounted on the mounting frame body 25 to move in a direction far away from or close to the unwinding roller 2. When the pressing wheels 23 move in the direction close to the unwinding roller 2, the unwinding roller 2 may be pressed on the support roller 22 to prevent the unwinding roller 2 from falling off the support roller 22, and when the pressing wheels 23 move in the direction far away from the unwinding roller 2, the unwinding roller 2 may be dismounted from the support roller 22 or the unwinding roller 2 may be placed on the support roller 22. In the present invention, the rack 1 is provided (welded) with a limiting block 27 above the connecting rod 26, wherein the limiting block 27 is located at one side close to the mounting frame driving device 24, and when the pressing wheels 23 press the unwinding roller 2 downwardly, a top portion of the connecting rod 26 is contacted with the limiting block 27, thus avoiding the mounting frame driving cylinder from extending excessively to cause an excessively large pressure of the pressing wheels 23 so as to prevent the unwinding roller 2 from rotating.

In the present invention, preferably, the rack 1 is provided with a die head mounting frame, the hot melt adhesive die head 4 is detachably mounted on the die head mounting frame by a bolt, the die head mounting frame comprises a horizontal support plate 28 and two vertical support plates 29, top ends of the two vertical support plates 29 are respectively detachably connected to two ends of the horizontal support plate 28 by bolts, middle portions of the vertical support plates 29 are connected to the rack 1 by a connecting shaft, and a lower portion of the rack 1 is provided with a support plate driving device 30 for driving the vertical support plates 29 to rotate relative to the rack 1. In the present invention, the support plate driving device 30 is a support plate driving cylinder, a cylinder body of the support plate driving cylinder is rotatably connected to the left vertical plate 101 and the right vertical plate 102 respectively, and a free end of a piston rod of the support plate driving cylinder is rotatably connected to bottom ends of the vertical support plates 29. The support plate driving device 30 drives the vertical support plates 29 to rotate for adjusting a distance between the hot melt adhesive die head 4 and the adhesive coating roller 5. In the present invention, the distance between the hot melt adhesive die head 4 and the adhesive coating roller 5 may be properly adjusted according to the thickness of adhesive coated on the cotton cloth.

The parts not specified in the above specification all belong to the prior art, or can be realized by the prior art. Moreover, the specific embodiments described in the present invention are only preferred embodiments of the present invention, and are not intended to limit the scope of implementation of the present invention. All equivalent changes and modifications made according to the contents in the patent scope of the present invention should belong to the technical scope of the present invention.

The invention claimed is:

1. An adhesive coating and perforating device for a medical adhesive tape, comprising a rack (1), an unwinding roller (2), a winding roller (3), a hot melt adhesive die head (4), an adhesive coating roller (5), a support roller (6) and a perforating roller (7), wherein the unwinding roller (2) is used for placing a cotton cloth to be coated with adhesive, the winding roller (3) is rotatably arranged on the rack (1), driven by a winding driving device to rotate relative to the rack (1), and used for winding the adhesive tape coated with adhesive, the hot melt adhesive die head (4) is mounted on the rack (1) and used for heating a hot melt adhesive and coating the hot melt adhesive on the cotton cloth, two ends of the adhesive coating roller (5) are rotatably mounted on the rack (1), and the adhesive coating roller (5) is located at a hot melt adhesive outlet side and used for pushing the cotton cloth in a direction towards the hot melt adhesive die head (4), two ends of the support roller (6) are rotatably arranged on the rack (1), two ends of the perforating roller (7) are rotatably connected to the rack (1) and capable of vertically moving on the rack (1), the cotton cloth coated with adhesive passes between the perforating roller (7) and the support roller (6), and a surface of the perforating roller (7) is provided with protruding points for perforating the hot melt adhesive on a surface of cotton cloth.

2. The adhesive coating and perforating device for the medical adhesive tape according to claim 1, wherein the rack (1) is provided with a roasting roller frame (8), a vertical guide groove (9) is formed on the roasting roller frame (8), a slider (10) is arranged in the vertical guide groove (9), the slider (10) is capable of moving vertically in the vertical guide groove (9), an upper portion of the roasting roller frame (8) is provided with a slider driving device for driving the slider (10) to move vertically, and two ends of the perforating roller (7) are rotationally connected to the slider (10).

3. The adhesive coating and perforating device for the medical adhesive tape according to claim 2, wherein a threaded hole is formed in the roasting roller frame (8), the slider driving device is a screw (11), the screw (11) penetrates through the threaded hole and is in screw-thread fit with the threaded hole, a bottom end of the screw (11) abuts against a top portion of the slider (10) to press the slider (10) downwardly, and a bottom portion of the slider (10) is provided with an elastic member (12) for pushing the slider (10) upwardly when the screw (11) moves upwardly.

4. The adhesive coating and perforating device for the medical adhesive tape according to claim 3, wherein the elastic member (12) is more than one spring, a guide hole communicated with the vertical guide groove (9) is formed in a bottom portion of the roasting roller frame (8), a bottom end of the slider (10) is fixed with a guide rod (13), and when the slider (10) slides vertically, the guide rod (13) moves in the guide hole.

5. The adhesive coating and perforating device for the medical adhesive tape according to claim 1, wherein one end of the rack (1) for mounting the winding roller (3) is provided with a winding bracket (14), a U-shaped groove (15) is formed on the winding bracket (14), an opening of the U-shaped groove (15) faces one side far away from the rack (1), the winding roller (3) is mounted in the U-shaped groove (15), and the winding bracket (14) is rotatably provided with a fixing member at one side of the opening of the U-shaped groove (15) for fixing the winding roller (3) in the U-shaped groove (15) when in use.

6. The adhesive coating and perforating device for the medical adhesive tape according to claim 5, wherein the fixing member comprises a blocking rod (16), one end of the blocking rod (16) is rotatably connected to the winding bracket (14), and the other end of the blocking rod (16) is a free end for being detachably connected to the winding bracket (14) when in use, thus blocking the winding roller (3) in the U-shaped groove (15).

7. The adhesive coating and perforating device for the medical adhesive tape according to claim 6, wherein a bottom end of the blocking rod (16) is rotatably connected to a lower portion of the winding bracket (14), a first mounting groove (17) communicated with the U-shaped groove (15) is formed at one side of a top portion of the winding bracket (14) far away from the rack (1), a second mounting groove (18) corresponding to the first mounting groove (17) is formed at the free end of the blocking rod (16), a fixing rod (19) is rotatably arranged in the first mounting groove (17), the fixing rod (19) is provided with a fixing block (20) in screw-thread fit with the fixing rod, and the fixing rod (19) is turned up and down and matched with the fixing block (20) to fix the free end of the blocking rod (16) when in use.

8. The adhesive coating and perforating device for the medical adhesive tape according to claim 1, wherein a mounting notch (21) is formed at one end of the rack (1) for mounting the unwinding roller (2), the rack (1) below the mounting notch (21) is rotatably provided with two support wheels (22) for supporting the unwinding roller (2) from the bottom portion, the rack (1) is rotatably provided with a pressing wheel mounting frame, the pressing wheel mounting frame is rotatably provided with two pressing wheels (23), the two pressing wheels (23) are used for pressing the unwinding roller downwardly from the top portion, and the rack (1) is provided with a mounting frame driving device (24) for driving the pressing wheel mounting frame to turn up and down to make the pressing wheels (23) close to or far away from the unwinding roller (2).

9. The adhesive coating and perforating device for the medical adhesive tape according to claim 8, wherein the pressing wheel mounting frame comprises a mounting frame body (25) and a connecting rod (26), a middle portion of the connecting rod is rotationally connected to the rack (1) by a rotating shaft, one end of the connecting rod (26) is fixedly connected to the mounting frame body (25), the other end of the connecting rod is connected to the mounting frame driving device (24), the rack (1) is provided with a limiting block (27) above the connecting rod (26), wherein the limiting block (27) is located at one side close to the mounting frame driving device (24), and when the pressing wheels (23) press the unwinding roller (2) downwardly, a top portion of the connecting rod (26) is contacted with the limiting block (27).

10. The adhesive coating and perforating device for the medical adhesive tape according to claim 1, wherein the rack (1) is provided with a die head mounting frame, the hot melt adhesive die head (4) is mounted on the die head mounting frame, the die head mounting frame comprises a horizontal support plate (28) and two vertical support plates (29), top ends of the two vertical support plates (29) are respectively connected to two ends of the horizontal support plate (28), middle portions of the vertical support plates (29) are connected to the rack (1), a lower portion of the rack (1) is provided with a support plate driving device (30) for driving the vertical support plates (29) to rotate relative to the rack (1), and the support plate driving device (30) drives the vertical support plates (29) to rotate for adjusting a distance between the hot melt adhesive die head (4) and the adhesive coating roller (5).

* * * * *